United States Patent [19]

Coco et al.

[11] Patent Number: 5,691,085
[45] Date of Patent: Nov. 25, 1997

[54] NON-SINTERED ELECTRODE FOR AN ALKALINE ELECTROLYTE SECONDARY CELL

[75] Inventors: Isabelle Coco, Talence; Jean-Michel Cocciantelli, Bordeaux; Jean-Jacques Villenave, Talence, all of France

[73] Assignee: Saft, Romainville, France

[21] Appl. No.: 723,252

[22] Filed: Sep. 30, 1996

[30] Foreign Application Priority Data

Jul. 23, 1996 [FR] France .................................. 96 09211

[51] Int. Cl.⁶ ........................................... H01M 4/62
[52] U.S. Cl. ................ 429/217; 29/623.5; 427/372.2
[58] Field of Search ............................. 429/217, 101, 429/59, 209; 29/623.5; 427/372.2, 388.5, 388.4, 126.3, 126.6

[56] References Cited

U.S. PATENT DOCUMENTS

| | | | |
|---|---|---|---|
| 4,245,016 | 1/1981 | Rampel. | |
| 4,530,890 | 7/1985 | Rampel | 429/217 |
| 4,814,242 | 3/1989 | Maxfield et al. | 429/217 |
| 5,378,560 | 1/1995 | Tomiyama | 429/217 |

FOREIGN PATENT DOCUMENTS

| | | |
|---|---|---|
| 0740355A1 | 10/1966 | European Pat. Off. . |
| 0726607A1 | 8/1996 | European Pat. Off. . |
| 4441760A1 | 6/1995 | Germany . |

OTHER PUBLICATIONS

Patent Abstracts Of Japan, vol. 018, No. 586 (E–1627), 9 Nov. 1994, corresponding to JP 06 223833 A (Fuji Photo Film Co Ltd) dated Aug. 12, 1994.

Chemical Abstracts, vol. 94, No. 6, 9 Feb. 1981, Columbus, OH, US, Abstract No. 33719, Hitachi Maxell, Ld., Japan, "Alkaline Batteries" corresponding to JP 55030 267 A.

Chemical Abstracts, vol. 99, No. 18, 31 Oct. 1983, Columbus, OH, US, Abstract No. 143172, Toshiba Battery Co., Ltd., Japan, "Alkaline Batteries" corresponding to JP 58 073 956 A.

Chemical Abstracts, vol. 118, No. 8, 22 Feb. 1993, Columbus, OH, US, Abstract No. 63243, Mitsuyau, Kiyoshi, "Anodes for secondary nickel–hydrogen batteries" corresponding to JP 04 272 656 (Toshiba Co p).

*Primary Examiner*—Anthony Skapars
*Attorney, Agent, or Firm*—Sughrue, Mion, Zinn, Macpeak & Seas, PLLC

[57] ABSTRACT

The present invention concerns an electrode for an alkaline electrolyte secondary cell, comprising a current collector supporting a paste containing an electrochemically active material and a binder, characterized in that said binder is a copolymer selected from copolymers of maleic anhydride and a vinyl monomer, said binder being cross-linked after said electrode has been formed.

20 Claims, 1 Drawing Sheet

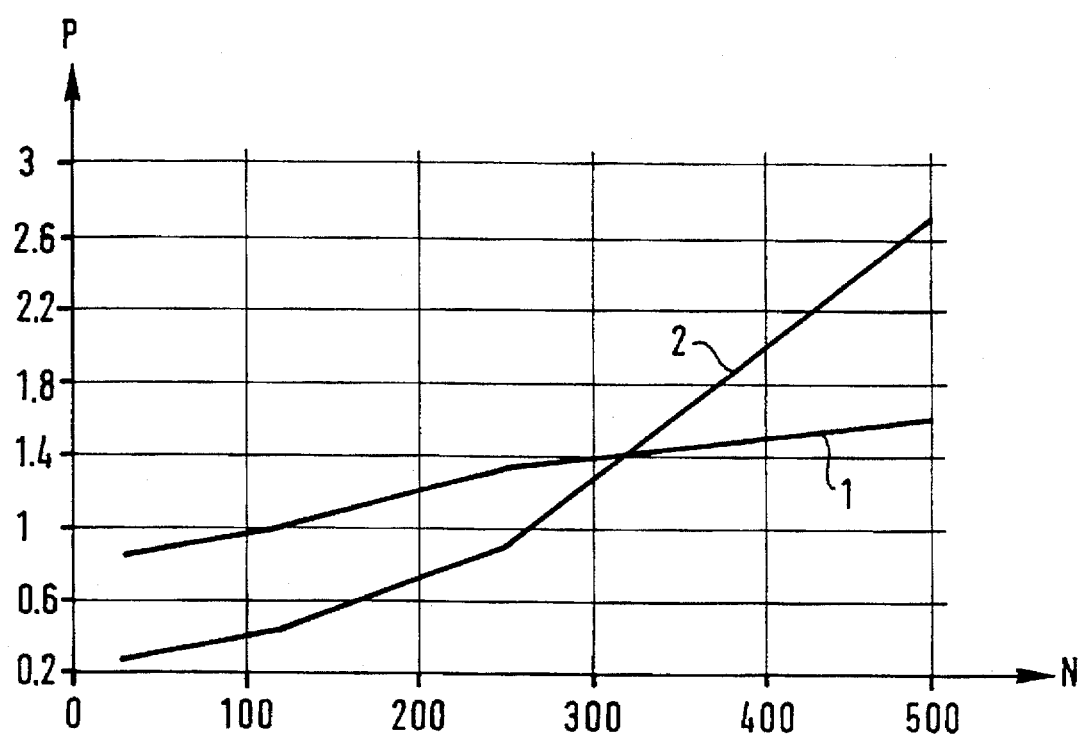

NON-SINTERED ELECTRODE FOR AN ALKALINE ELECTROLYTE SECONDARY CELL

The present invention concerns a non-sintered electrode used in a secondary cell containing an alkaline electrolyte. It also concerns a process for its preparation and applications of the electrode.

Until recently, all alkaline electrolyte secondary cells comprised a nickel electrode with a sintered support in the pores of which the active material is electrochemically or chemically deposited using several successive precipitation operations. This manufacturing process is long and costly. In order to satisfy user's increasing demands, these electrodes can now be produced differently. Electrodes with non-sintered supports are composed of a current collector of metal or carbon-containing material, for example a felt, sponge, screen or perforated strip, coated with a paste. The paste includes the active material, in this case a hydridable alloy, and a binder to which components a conducting material may be added.

The binder ensures cohesion of the grains of active material both to each other and to the electrode support before assembly of the cell and during operation. If, however, a large amount of binder is used, the electrical conductivity is reduced, thus lowering the voltage and the capacity of the cell at high loads. In addition, the electrochemically active surface area which is accessible to the electrolyte depends on the manner in which the grains of active material are coated and bonded by the polymer. It is thus vital that the inevitable loss of capacity resulting from the manufacture of the electrode is minimized. The lowest possible quantity of binder which is necessary but sufficient to ensure this cohesion has thus to be introduced.

More particularly, during cycling of the Ni-MH cell, the hydridable alloy successively absorbs and desorbs hydrogen which causes division and an increase in the volume of the electrode. The binder must be capable of following and limiting the volume increase in the electrode as it ages. The binder must also maintain electrical contact between the grains of hydridable alloy. Loss of conductivity of the MH electrode can never be recovered, in contrast to that occurring in a cadmium or zinc electrode, for example.

Fluorinated resins strengthen an electrode only if its content is over 3% by weight with respect to the active material, thus considerably reducing performance on rapid discharge. The adhesive properties of other binders degrade during cycling. Cellulose derivatives cannot retain intergranular cohesion after a rolling operation and during operation in the electrolyte. Thermoplastic elastomers can produce good electrochemical operation but the strength of the electrode rapidly becomes insufficient. Poly (vinylpyrrolidone) can produce good electrochemical yields but produce a rigid and fragile electrode which prevents any sizing by rolling.

The electrochemically active surface area of an electrode depends on the surface area which is wetted by the electrolyte. If the electrolyte is insufficiently wetted, the active surface area is reduced, causing an increase in local current density and a lower charged capacity. In order to encourage wettability of the electrode by the aqueous electrolyte, the binder must be hydrophilic in nature.

This is the case with cellulosic resins but the electrode strength degrades during cycling. For a binder in which the adhesive properties are sensitive to pressure, such as a styrene-butadiene copolymer, the wettability of the electrode deteriorates for contents of above 3% and the service life is curtailed.

In particular, the binder plays an important role in the electrochemical properties of the negative electrode of a Ni-MH cell. In a Ni-MH cell, the binder must allow reabsorption of hydrogen by a solid-gas route during discharge. The gas permeability conferred by the structure of the binder used is an essential criterion for proper operation of the electrode. For a high hydrogen reduction yield at the negative electrode, three-phase menisci must be produced at the negative electrode. These menisci form only when the electrode is hydrophobic in nature.

Fluorinated resins are markedly hydrophobic in nature, rendering impregnation of the electrode and retention of the electrolyte difficult. This affects performance under rapid conditions. Numerous polymers are known for their low permeability to hydrogen, for example vinyl polymers.

An aim of the present invention is to provide an electrode which combines and conserves over time the qualities mentioned above as regards electrochemical performance and strength without having the disadvantages of known electrodes.

A further aim of the present invention is to provide an electrode which has a high absorption/desorption yield over its entire service life, and which can thus be used as the negative electrode in a Ni-MH cell.

The invention thus provides an electrode for an alkaline electrolyte secondary cell, comprising a current collector supporting a paste containing an electrochemically active material and a binder, characterized in that said binder is a copolymer selected from copolymers of maleic anhydride and a vinyl monomer, said binder being cross-linked after said electrode has been formed.

The electrode of the invention has improved performance, in particular under rapid conditions, due to its binder wetting properties. The binder also forms a fibrous structure in the electrode, facilitating the transport of gas to the alloy surface.

Preferably, said binder is selected from a copolymer of maleic anhydride and styrene (SMA) and a copolymer of maleic anhydride and vinyl ether (EVMA).

These copolymers have the advantage of great stability under the operating conditions of the cell. Further, these copolymers are commercially available.

Preferably, said copolymer has an acid index which is in the range 250 to 500. The term "acid index" means the weight in milligrams (mg) of potassium hydroxide KOH required to neutralize one gram of copolymer.

Advantageously, said binder has a degree of cross-linking which is in the range 20 mole % to 50 mole % with respect to the number of anhydride groups in the copolymer. The term "degree of cross-linking" means the number of anhydride groups which have reacted with the cross-linking agent. For degrees of cross-linking of less than 20%, the strength is not substantially improved. For a degree of more than 50%, the rigidity of the electrode greatly increases.

For the binder to be stable, it is vital that it is cross-linked; as an example, SMA which is not cross-linked is soluble in the electrolyte. The presence of a cross-linking agent is thus required.

In a preferred embodiment, said paste also contains a cross-linking agent which is a polymer of ethylene oxide (PEO). Other cross-linking agents can also be used, for example diols or diamines.

Said cross-linking agent has a molar mass in the range 200 g/mole to 1000 g/mole. The molecule length of the cross-linking agent must be sufficient to obtain a flexible network. However, the molar mass must be limited, otherwise the properties of the agent would mask those of the copolymer.

The proportion T of said cross-linking agent in said paste containing said copolymer of maleic anhydride and a vinyl monomer is defined by the following relationship:

$$T = \overline{M}_{PEO} \times \frac{R}{4} \times \frac{Ia}{56.11 \times 10^3}$$

where:

T corresponds to the mass of said cross-linking agent in grams per gram of said copolymer;

$\overline{M}_{PEO}$ is the average molar mass of said cross-linking agent in grams per mole;

R is said degree of cross-linking;

$I_a$ is said acid index; and 56.11 represents the molar mass of potassium hydroxide KOH in grams per mole.

Preferably, the proportion T of said cross-linking agent is in the range 0.04 to 1.1. These limits are correlated with the values of the acid index. For SMA, this range of values corresponds to an acid index in the range 250 to 500. As an example, an EVMA with an acid index of 450 will require a proportion of cross-linking agent in the range 0.08 to 0.21.

It is vital to minimize the loss of capacity resulting from manufacture of the electrode by introducing the lowest possible amount of binder which is necessary but sufficient to ensure the strength of the electrode. Below a proportion T of 0.04, the electrode is not sufficiently rigid, but above 1.1, the electrode becomes too rigid.

A copolymer of maleic anhydride and styrene has the following general formula, where φ represents the phenyl radical:

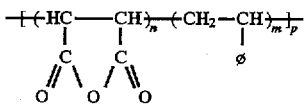

Preferably, said copolymer of maleic anhydride and styrene has a ratio m/n of styrene/maleic anhydride groups which is in the range 1 to 4.

A copolymer of maleic anhydride and vinyl ether has a general formula:

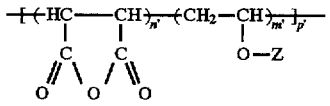

where Z is a non functional alkyl group selected from a methyl, ethyl, butyl and 2-ethylhexyl group.

Preferably, said copolymer of maleic anhydride and vinyl ether has a ratio n'/m' of styrene/vinyl ether groups which is of the order of 1.

In a variation, said paste also contains at least one additive selected from a conductive material and a thickening agent.

In a further variation, said current collector is a metal support selected from a felt, a sponge, a screen, a perforated strip, and an embossed strip. The term "embossed strip" means a strip which is perforated and deformed to produce relief portions on its surface. The metal support is preferably a nickel support.

In a still further variation, said paste also contains a conductive material selected from carbon and nickel powder.

In a yet still further variation, said paste also contains a cellulosic thickening agent.

In a particular embodiment, said active material is a hydridable alloy. In this case, the electrode can function as the negative electrode in a nickel-metal hydride cell.

The present invention also provides a process for the production of an electrode according to any one of the preceding claims, comprising the following steps:

producing said paste by adding a solution of said binder and said cross-linking agent to a suspension of said active material in powder form in water;

forming an electrode by coating said current collector with said paste; and carrying out a cross-linking treatment on said electrode.

Said binder solution is selected from an alkaline solution and an organic solution.

Cross-linking can be carried out using a variety of methods which are known to the skilled person. Preferably, said cross-linking treatment is a heat treatment.

In a variation, said suspension also contains at least one additive selected from a powdered conductive material and a thickening agent.

The present invention also concerns a nickel-metal hydride cell containing said electrode.

Further characteristics and advantages of the present invention will become apparent from the following examples which are, of course, given by way of illustration and are not limiting, given with reference to the accompanying drawing in which the single figure shows the comparative evolution of the variation in charging pressure P in bars as a function of the number of cycles N, for a prior art cell and for a cell of the invention.

EXAMPLE 1

A prior art electrode I was produced by introducing a paste into a three-dimensional porous support which was a nickel sponge, the paste being composed of:

99.1% by weight of a hydridable alloy powder of form $AB_n$, where A was a "MISCHMETAL" and B was a nickel which had been partially substituted by Mn, Al, and/or Co;

0.3% by weight of a cellulosic thickening agent;

0.3% by weight of a conductive material which was a carbon powder; and 0.3% by weight of binder which was a styrene-butadiene copolymer (SBR) in the form of an aqueous suspension.

The viscosity of the paste was adjusted with water. Once the support had been coated with paste, the electrode was dried to eliminate the water and cross-link the binder.

EXAMPLE 2

A prior art electrode II was produced as described in Example 1, with the exception that the paste was composed of:

94.4% by weight of hydridable alloy powder;

0.3% by weight of cellulosic thickening agent;

0.3% by weight of conductive material; and

5% by weight of SBR binder.

The electrode was then prepared as in Example 1.

EXAMPLE 3

An electrode III which was in accordance with the invention was produced as described in Example 1, with the exception that the paste was composed of:

99% by weight of hydridable alloy powder;

0.3% by weight of cellulosic thickening agent;

0.3% by weight of conductive material;

0.3% by weight of a binder which was a copolymer of maleic anhydride and styrene (SMA) in the form of a powder dissolved in a very small quantity of acetone; and 0.1% of a cross-linking agent which was an ethylene oxide polymer (PEO).

The electrode was then prepared as in Example 1.

EXAMPLE 4

An electrode IV which was in accordance with the invention was produced as described in Example 1, with the exception that the paste was composed of:

92.6% by weight of hydridable alloy powder;

0.3% by weight of cellulosic thickening agent;

0.3% by weight of conductive material;

5% by weight of SMA binder; and 1.8% of PEO cross-linking agent.

The electrode was then prepared as in Example 1.

EXAMPLE 5

The wettability of electrodes I to IV produced above was determined by immersion in an electrolyte, an 8.7N alkaline solution containing two components. After 4 hours, the electrolyte absorption was determined by measuring the weight increase of the electrode.

Retention of the electrolyte by the electrodes was evaluated by placing the electrode on a glass plate which was inclined at an angle of 45 above the horizontal. The electrode was allowed to drain for 45 minutes and the weight loss of the electrode was measured.

The results are shown in Table 1 below. Absorption and retention of electrolyte are expressed as the % by weight with respect to the weight of the dry electrode.

TABLE 1

| electrode | absorption % | retention % |
|---|---|---|
| I | 2.5 | 1.3 |
| II | 2.3 | 1 |
| III | 4.8 | 2.7 |
| IV | 10.5 | 9.6 |

Comparison of these results for equal amounts of binder shows that the wettability of an electrode of the invention is substantially superior to that of the prior art electrodes, and as a consequence these electrodes have a more extensive electrochemically active surface area.

EXAMPLE 6

Electrodes I to IV produced above were electrochemically evaluated in cells containing an 8.7N alkaline solution containing two components as an electrolyte, mounted opposite a non-sintered nickel electrode. The cells were placed in a sealed container provided with a pressure gauge to follow the evolution of the hydrogen pressure on charging. The design of the cells was such that their capacity was limited by that of the negative electrode.

The test was carried out under the following conditions, where Ic represents the load required to charge the electrode in 1 hour:

cycles 1 to 4: charge at a load of 0.2 Ic for 7.5 hours; discharge at 0.2 Ic to a voltage of 1 volt;

cycle 5: charge at 0.2 Ic for 7.5 hours; discharge at Ic to 0.8 volts.

The charged capacity $C_4$ was measured at cycle 4 before hydrogen was released, along with the discharged capacity $D_4$, and the discharged capacity $D_5$ was measured at cycle 5, also the half-discharge voltage $V_5$. The results are shown in Table 2 below. The capacities are expressed in milliampere hours per gram of active material and the voltage is expressed in volts.

TABLE 2

| electrode | $C_4$ | $D_4$ | $D_5$ | $V_5$ |
|---|---|---|---|---|
| I | 253 | 301 | 270 | 1.115 |
| II | 240 | 273 | 240 | 1.100 |
| III | 251 | 304 | 283 | 1.128 |
| IV | 273 | 304 | 267 | 1.126 |

These results show that an electrode of the invention, even in the case when it includes a large quantity of binder, and performed better than the prior art electrodes.

EXAMPLE 7

Electrodes I and III produced above were evaluated in sealed Ni-MH type cells which had a capacity of 10 Ah. The electrolyte in the cell was an 8.7N alkaline solution containing three components. The electrodes were mounted opposite a non-sintered nickel electrode. A non-woven polyolefin separator was placed between the electrodes. The cells were provided with a pressure sensor.

The cycling test was carried out under the following conditions for 500 cycles:

charge at a load of 2 amperes for 7.5 hours;

discharge at 3.3 A to a stop voltage of 1 volt.

The results are shown in Table 3 below and in the single figure. The following were respectively measured at cycles 30 and 500: the pressure variation during charging, $P_{30}$ et $P_{500}$, the discharged capacity $D_{30}$ et $D_{500}$, and the half-discharge voltage $V_{30}$ et $V_{500}$. The pressure variation is given in bars, capacities are expressed in milliampere-hours per gram of active material, and the voltage is expressed in volts.

TABLE 3

| electrode | | $P_{30}$ | $D_{30}$ | $V_{30}$ |
|---|---|---|---|---|
| | cycle 30 | | | |
| I | | 0.3 | 11.35 | 1.205 |
| III | | 0.8 | 11.45 | 1.205 |
| | cycle 500 | $P_{500}$ | $D_{500}$ | $V_{500}$ |
| I | | 2.7 | 12.75 | 1.230 |
| III | | 1.8 | 12.80 | 1.230 |

These results show that the pressure P in the cell containing an electrode of the invention (curve 1) was more stable than in the cell containing a prior art electrode (curve 2), in particular beyond 300 cycles.

We claim:

1. An electrode for an alkaline electrolyte secondary cell, comprising a current collector supporting a paste containing an electrochemically active material and a binder, characterized in that said binder is a copolymer selected from copolymers of maleic anhydride and a vinyl monomer, said binder being cross-linked after said electrode has been formed.

2. An electrode according to claim 1, in which said binder is selected from a copolymer of maleic anhydride and styrene (SMA) and a copolymer of maleic anhydride and vinyl ether (EVMA).

3. An electrode according to claim 1, in which said copolymer has an acid index which is in the range 250 to 500.

4. An electrode according to claim 1, in which said binder has a degree of cross-linking in the range 20 mole % to 50 mole % with respect to the number of anhydride groups in the copolymer.

5. An electrode according to claim 1, in which said paste also contains a cross-linking agent which is a polymer of ethylene oxide (PEO).

6. An electrode according to claim 5, in which said cross-linking agent has a molar mass in the range 200 g/mole to 1000 g/mole.

7. An electrode according to claim 1, in which proportion T of said cross-linking agent in said paste containing said copolymer of maleic anhydride and a vinyl monomer is defined by the following relationship:

$$T = \overline{M}_{PEO} \times \frac{R}{4} \times \frac{I_a}{56.11 \times 10^3}$$

where:

T corresponds to the mass of said cross-linking agent in grams per gram of said copolymer;

$\overline{M}_{PEO}$ is the average molar mass of said cross-linking agent in grams per mole;

R is said degree of cross-linking;

$I_a$ is said acid index; and 56.11 represents the molar mass of potassium hydroxide.

8. An electrode according to claim 7, in which the proportion T of said copolymer is in the range 0.04 to 1.1.

9. An electrode according to claim 1, in which said copolymer of maleic anhydride and styrene has a ratio m/n of styrene/maleic anhydride groups which is in the range 1 to 4.

10. An electrode according to claim 1, in which said copolymer of maleic anhydride and vinyl ether has a ratio of styrene/vinyl ether groups which is of the order of 1.

11. An electrode according to claim 1, in which said paste also contains at least one additive selected from a conductive material and a thickening agent.

12. An electrode according to claim 1, in which said current collector is a metal support selected from a felt, a sponge, a screen, a perforated strip, and an embossed strip.

13. An electrode according to claim 1, in which said paste also contains a conductive material selected from nickel and carbon powder.

14. An electrode according to claim 1, in which said paste also contains a cellulosic thickening agent.

15. An electrode according to claim 1, in which said active material is a hydridable alloy.

16. A process for the production of an electrode according to any one of the preceding claims, comprising the following steps:

producing said paste by adding a solution of said binder and said cross-linking agent to a suspension of said active material in powder form in water;

forming an electrode by coating said current collector with said paste; and carrying out a cross-linking treatment on said electrode.

17. A process according to claim 16, in which said binder solution is selected from an alkaline solution and an organic solution.

18. A process according to claim 16, in which said cross-linking treatment is a heat treatment.

19. A process according to claim 16, in which said suspension also contains at least one additive selected from a powdered conductive material and a thickening agent.

20. A nickel-metal hydride secondary cell containing an electrode according to claim 15.

* * * * *

UNITED STATES PATENT AND TRADEMARK OFFICE
CERTIFICATE OF CORRECTION

PATENT NO. : 5,691,085
DATED : November 25, 1997
INVENTOR(S) : Isabelle Coco, et al.

It is certified that error appears in the above-indentified patent and that said Letters Patent is hereby corrected as shown below:

Column 1, after the "Title of the Invention", insert

--The Government of the United States of America has rights in this invention pursuant to Cooperative Agreement No. DE-FC02-91CE50336 awarded by the U.S. Department of Energy--.

Signed and Sealed this

Twenty-seventh Day of March, 2001

Attest:

NICHOLAS P. GODICI

Attesting Officer *Acting Director of the United States Patent and Trademark Office*